United States Patent [19]
Sakoe

[11] Patent Number: 4,670,850
[45] Date of Patent: Jun. 2, 1987

[54] PATTERN MATCHING APPARATUS
[75] Inventor: Hiroaki Sakoe, Tokyo, Japan
[73] Assignee: NEC Corporation, Tokyo, Japan
[21] Appl. No.: 631,692
[22] Filed: Jul. 17, 1984
[30] Foreign Application Priority Data
  Jul. 19, 1983 [JP] Japan ................. 58-131438
[51] Int. Cl.⁴ .............................................. G10L 5/00
[52] U.S. Cl. ................................. 364/513.5; 381/43
[58] Field of Search .................................. 381/41–47; 382/34, 36
[56] References Cited
U.S. PATENT DOCUMENTS
4,181,821  1/1980  Pirz et al. ............................ 381/43
4,475,238 10/1984  Everhart ............................. 382/34

Primary Examiner—E. S. Matt Kemeny
Attorney, Agent, or Firm—Sughrue, Mion, Zinn, Macpeak & Seas

[57] ABSTRACT

For improved pattern recognition, the reference pattern feature sequence contains control parameters (operators) which provide branching and/or omission of those portions of words which may be non-standard due to speaker or dialect deformations. A pattern matching apparatus comprising a stack controller with two PUSH/POP stacks for addressing reference patterns to be used for correlations against the detected pattern information. The reference patterns may contain control characters indicating alternative reference pattern segments or segments which may be omitted.

9 Claims, 10 Drawing Figures

PATTERN MATCHING APPARATUS

BACKGROUND OF THE INVENTION

The present invention relates to an improvement in a pattern matching apparatus which constitutes an essential part of a character or voice recognition system.

Although the pattern matching system of the invention can be broadly applied to time sequence pattern matching, the following description of the invention will be focussed on the speech pattern by way of example.

Usually, the speech pattern can be expressed as a time sequence pattern of features. The speech recognition, therefore, is performed by comparing this time sequence pattern with a reference pattern, i.e., through a pattern matching. For a speech recognition at performing high accuracy, it is necessary to adopt a pattern matching method which is stable against the fluctuation of pattern, i.e., has a high capacity for adjusting to pattern fluctuation.

To overcome expansion and compression distortion in the time direction, a method called DP (Dynamic Programming) matching method, based on DP (dynamic programming process) proposed by the inventors, has been adopted to a satisfactory result. The details of the DP matching method are described in detail in, for example, U.S. Pat. No. 3,816,722 and a paper by HIROAKI SAKOE and SEIBI CHIBA entitled "Dynamic Programming Algorithm Optimization for Spoken Word Recognition", IEEE TRANSACTIONS ON ACOUSTICS, SPEECH, AND SIGNAL PROCESSING, VOL. ASSP-26, NO. 1, FEBRUARY 1978, pp. 43 to 49.

Actually, however, the speech pattern includes various deformations in addition to the time expansion and compression distortion. For instance, partial deformation of vowels is often found in a continuously uttered speech. Examples of such deformations are: nasalization in which, for example, a term "neck" [nek] is pronounced as [nẽk]; unvoicing in which, for example, a term "six" [siks] is pronounced as [sik]; omission in which, for example, a term piston [pistan] is pronounced as [pistn]; and elongation of a vowel. These deformations do not appear steadily but occur in quite an unpredictable manner depending on the speed of pronounciation and the phoneme at the preceding or succeeding side of the vowel.

Hitherto, in order to cope with the deformations of pronounciation, it has been necessary to prepare a plurality of reference patterns corresponding to various possible deformations. Especially, for unselected speakers, a great number of the reference patterns should be prepared. Therefore, it is necessary that the reference pattern itself have a large flexibility and that the matching process for comparing the input pattern with the reference pattern be made at a high efficiency. These are necessary also from the view point of reducing the capacity of the reference pattern memory.

SUMMARY OF THE INVENTION

Accordingly, it is a primary object of the invention to provide a pattern matching apparatus capable of dealing with various possible deformations of the pattern.

Another object of the invention is to provide a pattern matching apparatus which can deal with various possible deformations of pattern with reduced capacity of the reference pattern memory.

It is still another object of the invention to provide a pattern matching apparatus which is most suited to the recognition of continuously uttered words and which operate in synchronism with the input speech.

According to the invention, there is provided a pattern matching apparatus comprising: a reference pattern supplying means for supplying a reference feature sequence pattern containing control operators for controlling branching and/or omission; an input pattern supplying means for supplying an input pattern of input feature sequence; a distance computing section for computing the distance between the feature of said input pattern and said reference feature sequence pattern; a work memory having addresses adapted to be selected in accordance with the time point in said reference feature sequence pattern, and adapted to store the cumulative distance; a recurrence formula computing section for executing a DP matching recurrence formula computation in accordance with a plurality of values read out of the work memory and the cumulative distance; a stack for storing the control operator and the position at which the control operator appears; and a stack processing section having a stack control section which, when the control operator is detected, the PUSH/POP operation of the stack operates in accordance with the kind of the detected control operator, thereby to control the DP matching recurrence formula computation which is to be conducted in the recurrence formula computing section.

These and other objects, features and advantages of the invention will become clear from the following description of the preferred embodiments taken in conjunction with the accompanying drawings.

DESCRIPTION OF THE PREFERRED EMBODIMENTS

In order to deal with the partial deformation of the speech pattern, according to the invention, the reference pattern is treated as a time sequence pattern allowing branches in the reference pattern and abbreviations to vary the form of the recurrence formula of the DP matching by making use of a stack function.

More specifically, the time sequence pattern is allowed to include control operators expressed by "{", "/" and "}". More specifically, one of the time sequence pattern segments placed between the control operators "{" and "}" and sectioned by "/" is selectively used. In addition, the time sequence pattern segments placed between "[" and "]" can be omitted and a judgement is made as to whether these segments are to be omitted.

Figure 1:
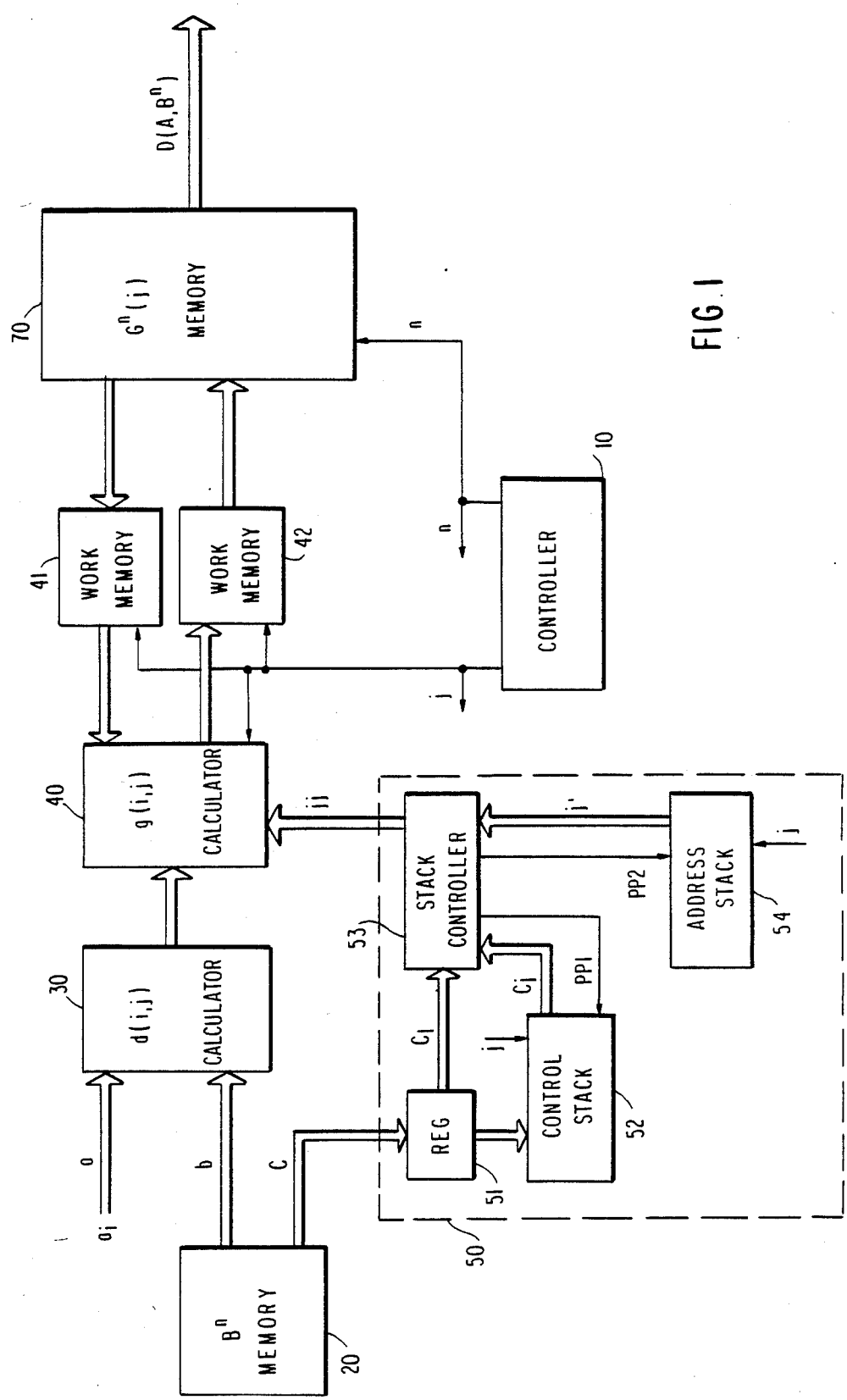
FIG. 1 is a block diagram of an embodiment of the pattern matching apparatus in accordance with the invention.

FIG. 1 shows an example of the pattern matching apparatus in accordance with the invention. This embodiment is used for speech recognition. This pattern matching apparatus has a basic arrangement and a recognition processing section which are well known, except the pattern matching section, for example, the aforementioned U.S. Pat. No. 3,816,722. The basic arrangement and the construction of the recognition processing section other than the pattern matching section, therefore, are not detailed here. Although this apparatus operates in response to address signals and clock signals given from the control section 10, only the control signals necessary for the explanation of operation are shown in the drawings.

The speech input pattern can be expressed as a time sequence pattern of feature vectors $a_i$ as follows.

$$A = a_1, a_2, \ldots, a_i, \ldots, a_I \qquad (1)$$

Thus, feature vectors $a_i$ are successively given to the pattern matching apparatus. The apparatus has a reference pattern memory 20 which stores reference pattern for each of the words to be recognized. Each word is designated by a number n.

Assume here that a set of words consisting of N words is expressed as follows:

$$\Sigma = \{n | n = 1, 2, \ldots N\} \qquad (2)$$

A reference pattern expressed by the following formula (3) is stored for the word n.

$$B^n = b^n{}_1, b^n{}_2 \ldots b^n{}_j \ldots b^n{}_{j n} \qquad (3)$$

When a reference pattern is treated generally, the following expression is used by omitting the suffix n.

$$B = b_1, b_2 \ldots b_j \ldots b_J \qquad (4)$$

This reference pattern includes, in addition to the features $b_j$, the following control operators which represent branching and omission.

"{": starting of branching
"/": sectioning of branches
"}": ending of branching
"[": starting of omission
"]": ending of omission The meanings or function of these control operators are obvious from the following example.

$$B = b_1, b_2\{b_3\ b_4/b_5\ b_6\ b_7/b_8\ b_9\}b_{10}\ b_{11}[b_{12}\ b_{13}\ b_{14}]b_{15} \qquad (5)$$

In this example of the reference pattern, one of the sections or factors $b_3\ b_4$, $b_5\ b_6\ b_7$, or $b_8\ b_9$ is selected and used, while the sections or factors $b_{12}\ b_{13}\ b_{14}$ may be omitted.

Figure 3:
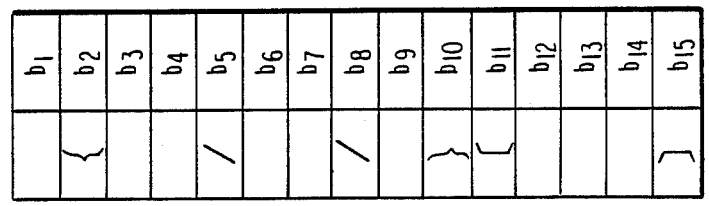

This reference pattern is described as shown in FIG. 3 in the reference pattern memory 20. Namely, the control operators are annexed as required to respective features $b_j$. The annexing of these control operators may be made in various manners. In this embodiment, however, the starting control operators "{" and "[" are annexed to the feature vectors which is just one time point prior to the feature vectors at which the branching and the omission have to be started, while other control operators "/", "]" and "}" are annexed to the feature vectors at which such control operators are to be started. The addresses in the memory 70 are selected by the word specifying signal n and the address signal j. The memory 70, therefore, stores a cumulative distance $G^n(j)$ which is obtained from the input feature vector $a_i$ and the reference pattern of the word n at the time point j.

The operation of this apparatus is as follows.

When the first feature vector $a_1$ is inputted, an initial setting is made as expressed by the formula (6) in response to the change of the word specifying signal n from 1 to N.

$$G^n(1) = d(1, 1) \qquad (6)$$

where, $d(1, 1)$ represents the Euclidean distance between the vectors $a_1$ and $b_1{}^n$. This distance can be generally defined by the following formula (7).

$$d(i,j) = \| a_i - b^n{}_j \| \qquad (7)$$

Figure 2:
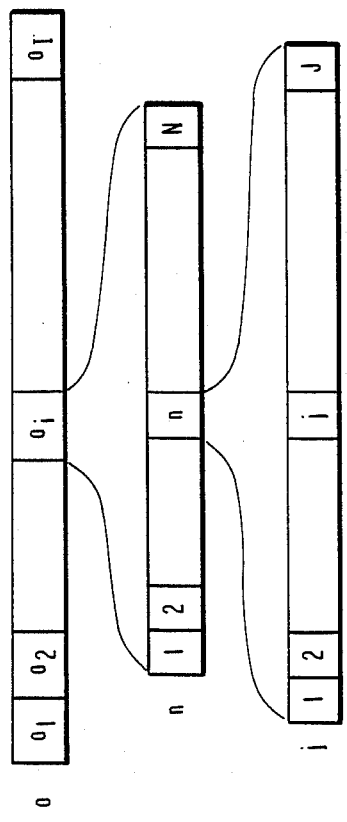
FIGS. 2 and 3 are illustrations of operation of the pattern matching apparatus as shown in FIG. 1.

The operation in response to the input vector $a_i$ will be explained hereinunder with specific reference to FIG. 2.

According to the invention, the matching with the feature vector $j = 1 \sim J^n$ of the reference pattern of each word is made for each time point of the input feature vector so that the cumulative distance $G^n(j)$ up to the time point $(i-1)$ has been determined when $a_i$ is supplied, and has been stored in the memory 70.

After the inputting of $a_i$, the control section 10 issues a word specifying signal n which varies from 1 to N. Then, the cumulative distance $G^n(j)$ ($j = 1$ to $J^n$) is transferred to a work memory 41 as the cumulative value $G_{i-1}(j)$ at the time point $(i-1)$. This transfer is referred to as "block transfer". Subsequently, the address signal j is counted up from 1 to $J^n$. The address is appointed by these values of j and n so that the feature vectors $b_j$ corresponding to the selected address is read out of the reference pattern memory 20 and delivered to the signal line b. At the same time, the control operator signal annexed to this vector is delivered to the signal line C.

If there is no control operator annexed, an ordinary computation of recurrence formula is conducted by the recurrence computing section 50. There are various kinds of recurrence formulae as described in the aforementioned paper "Dynamic Programming Algorithm Optimization for Spoken Word Recognition", especially in TABLE III on page 49. In this embodiment this computation is performed on the basis of the following formula (8).

$$g(i,j) = d(i,j) + \min \begin{Bmatrix} g(i-1, j) \\ g(i-1, j-1) \\ g(i-1, j-2) \end{Bmatrix} \qquad (8)$$

Namely, $g(i-1, j)$, $g(i-1, j-1)$ and $g(i-1, j-2)$ are read as the $G_1(j)$, $G_1(j-1)$ and $G_1(j-2)$, respectively, out of the work memory 41. These values are compared and the minimum value is determined. On the other hand, the distance computing section 30 computes the Euclidean distance $d(i, j)$ between the feature vector $a_i$ of the input and the vector $b_j{}^n$ of the reference pattern, and the computed distance is delivered as the signal d to the recurrence formula computing section 40. This dis- —tance d(i, j) is added to the aforementioned minimum value. The computation in accordance with the formula (8) is thus completed. The thus obtained g(i, j) is stored as $G_2(j)$ in a register 42. As stated above, when there is no control operator annexed, the basic recurrence formula computation expressed by the formula (8) is conducted repeatedly. The DP path in this state is denoted by a reference numeral 1 in FIG. 6A.

Figure 5A:
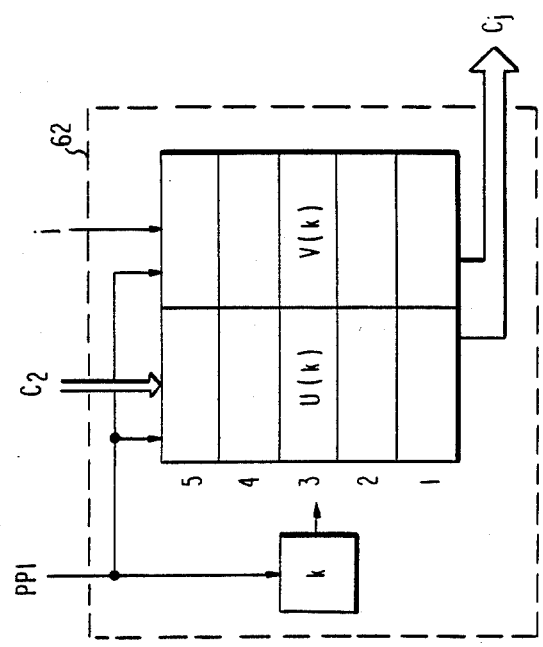
FIGS. 5A and 5B are schematic illustrations of the arrangement of a control stack 52 and an address stack 54 in the apparatus shown in FIG. 1.
Figure 5B:
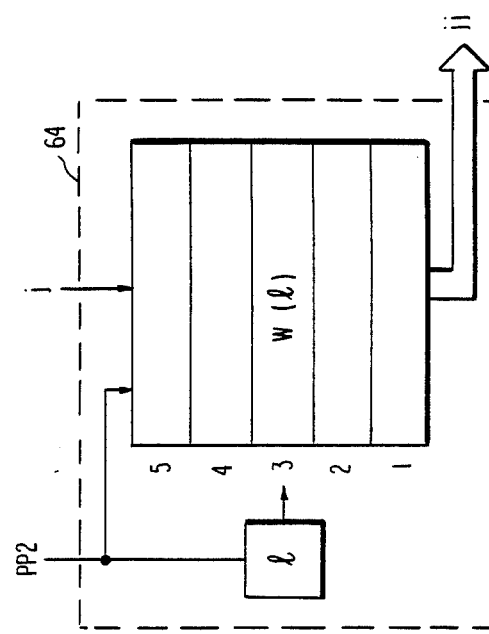
Figure 4A:
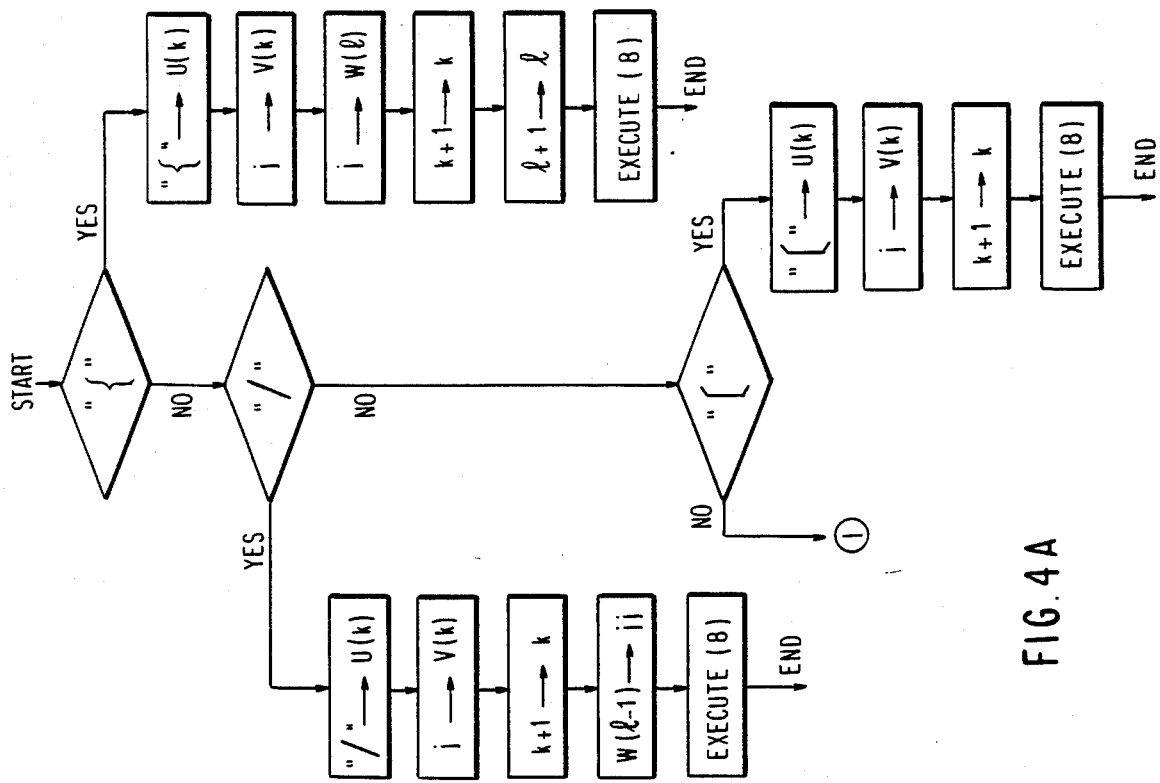
FIGS. 4A and 4B are flow charts illustrating the operation of the apparatus in accordance with the invention as shown in FIG. 1.
Figure 4B:
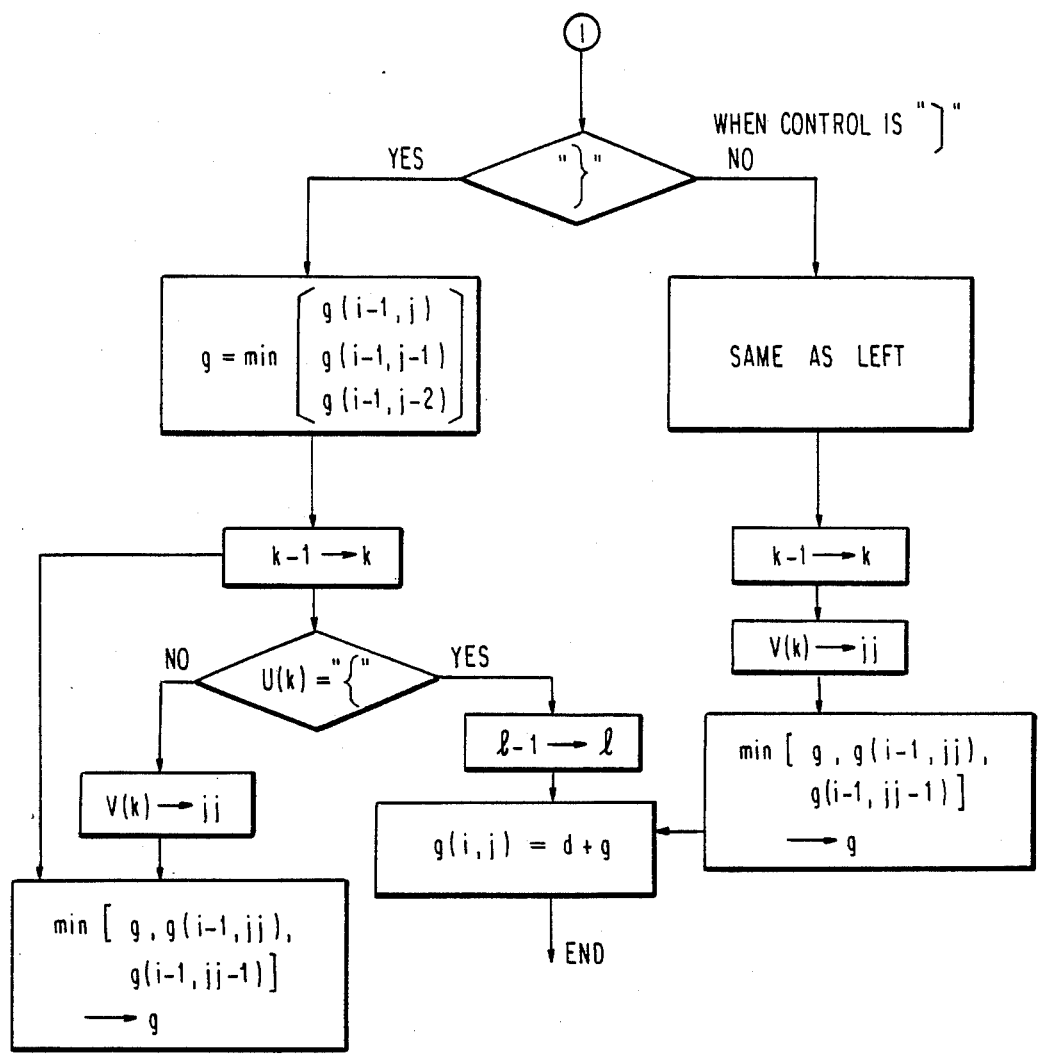

When the feature vector $b_j$ read out from the reference pattern memory 20 has a control operator annexed thereto, the apparatus operates in a manner which will be explained hereinunder with reference to FIGS. 4A and 4B. The control operator is delivered to a register 51 through the signal line C and further to a stack control section 53 through a signal line $C_1$. In the stack control section 53, the kind of the annexed control operator is discriminated. The stack processing section 50 includes, in addition to the stack control section 53, two kinds of stacks: namely, a control stack 52 and an address stack 54 which have constructions as shown in FIGS. 5A and 5B, respectively. The address selection for the control stack 52 is made by a stack counter signal k, while the selection for the address stack 54 is made by means of the stack counter signal l. These counters have an initial value "1".

As the branching starting control "{" is detected, the stack control section 53 produces control signals PP1, PP2. In response to the control signal PP1, the control "{" and the aforementioned address signal j at this time point are written in the address k of the control stack 52. If this control is the first one to appear, the address k is given as k=1. On the other hand, in response to the control signal PP2 the aforementioned address signal j is written in the address l of the address stack 54. Subsequently, the stacks 52 and 54 store, in response to the signals PP1 and PP2, the counter contents k+1 and l+1 as new values k and l, i.e., the push operation (k+1→k, l+1→l) is carried out. By using the feature vector $b_j$ the calculation expressed by the formula (8) is performed in the distance computing section 30 and the recurrence computing section 40.

When the branch sectioning control operator "/" is detected, the control operator "/" and the address signal j at this time point are stored in the address k of the control stack 52 in accordance with the control signal PP1, and a push processing for storing k+1 as the new value of k (i.e., k+1→k) is conducted. At the same time, the content of the (l−1) address in the address stack 54 is read as the signal j' by the control signal PP2. This signal j' is transferred to the recurrence formula computing section 40 as the signal jj. In this section 40, the following DP recurrence formula processing is conducted on the basis of this signal jj.

$$g(i, 1) = d(i, j) + \min \begin{Bmatrix} g(i\text{-}1, j) \\ g(i\text{-}1, jj) \\ g(i\text{-}1, jj\text{-}1) \end{Bmatrix} \quad (9)$$

As in the case of the formula (8), the value g of the right side of the formula is read out of the work memory 41 and the value g(i, j) obtained as the result is stored in the work memory 42.

Figure 6B:
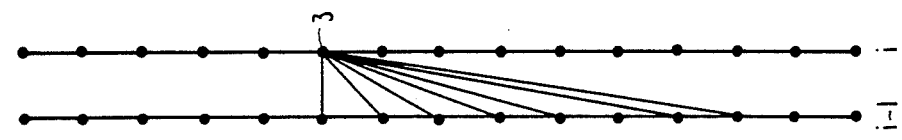
FIGS. 6A and 6B are illustrations for facilitating the understanding of the operation in accordance with FIGS. 6A and 6B.
Figure 6A:
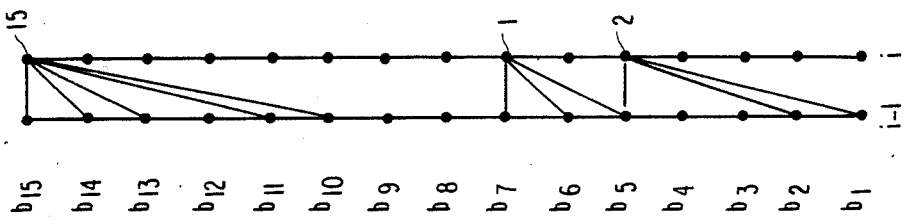

An explanation will be made hereinunder as to the significance of the formula (9). The signal jj read out of the address stack 54 is the value of the address j of the branching starting control operator "{" which appeared immediately before the reading of the signal jj. The terms g(i−1, jj) and g(i−1, jj−1) in the right side of the formula (9), therefore, evaluate the connection from the address immediately before the branching starting control operator "{" to the present address j. The computation of recurrence formula as represented by a numeral 2 in FIG. 6A is conducted in correspondence to the "/" at j=5 in the formula (5) and the example shown in FIG. 3. That is, the connection from j=2 is evaluated. A similar processing is conducted for the branch section control operator expressed by j=8.

A description will be made hereinunder as to the operation conducted when the branching ending control operator "}" is detected. In this case, upon receipt of the control signal PP1, the control stack 52 conducts such a POP processing as to read the control and the address signal as $C_j$ from the address k, by using k−1 as the new value of k.

Then, in the stack control section 63, the read out control operator is determined and, if this control operator proves to be "/", the address signal contained in the aforementioned signal $C_j$ is sent to the recurrence computing section 40 as the signal jj. This processing is repeated until the branching starting control operator "{" is read out of the control stack 52. When this control operator "{" is read out, the control signal PP2 is delivered to the address stack 54. Finally, a POP processing is effected in the address stack 54 by using l−1 as the new value of l(i.e., l−1→l).

Meanwhile, in the recurrence formula computing section 40, the detection of the minimum value is conducted out of g(i−1, j), g(i−1, j−1) and g(i−1, j−2) read out of the work memory 41, and g(i−1, jj−1), g(i−1, jj−2) read out of the work memory 41 corresponding to the aforementioned signal jj, and finally the value d(i, j) is added to the thus detected minimum value.

Namely, a recurrence formula computation in accordance with the following formula (10) is conducted, in which the values of successively given jj are represented by $j_1, j_2 \ldots$ $$g(i, j) = d(i, j) + \min \begin{bmatrix} g(i\text{-}1, j) \\ g(i\text{-}1, j\text{-}1) \\ g(i\text{-}1, j\text{-}2) \\ g(i\text{-}1, j_1\text{-}1) \\ g(i\text{-}1, j_1\text{-}2) \\ g(i\text{-}1, j_2\text{-}1) \\ g(i\text{-}1, j_2\text{-}2) \end{bmatrix} \quad (10)$$

In the Example shown by the formula (5) and in FIG. 3, $j_1=8$ and $j_2=5$, corresponding to the position of the control operator "/" appeared just before the control operator "}", are read as $j_1$ and $j_2$. Therefore, under the condition of j=10, a computation is made in accordance with the following recurrence formula (11).

$$g(i, 10) = d(i, 10) + \min \begin{bmatrix} g(i\text{-}1, 10) \\ g(i\text{-}1, 9) \\ g(i\text{-}1, 8) \\ g(i\text{-}1, 7) \\ g(i\text{-}1, 6) \\ g(i\text{-}1, 4) \\ g(i\text{-}1, 3) \end{bmatrix} \quad (11)$$

Namely, a decision is made as to which one of the three sections separated by the control operators "/" is most suitable. The DP path in this state is denoted by a reference numeral 3 in FIG. 6B.

When the omission starting control operator "[" is detected, this control operator "[" and the present address signal j are written in the address k of the control stack 52, according to the control signal PP1, and a PUSH processing is conducted by using k+1 as the new value of k. In this case, the aforementioned formula (8) is used as the DP recurrence formula. When the omission completion control operator "]" is detected, k−1 is used as k and the signal $C_j$ is read out of the address k of the control stack. Then, the content at the address specified by this signal is transferred as the signal jj to the recurrence formula computing section 40 by means of the stack control section 53. In this computing section 40, a computation is made in accordance with the following recurrence formula.

$$g(i,j) = d(i,j) + \min \begin{bmatrix} g(i\text{-}1, j) \\ g(i\text{-}1, j\text{-}1) \\ g(i\text{-}1, j\text{-}2) \\ g(1\text{-}1, jj) \\ g(i\text{-}1, jj\text{-}1) \end{bmatrix} \quad (12)$$

A determination is made as to whether the sections from (jj+1) to (j−1) are to be omitted. Consequently, in the example shown in FIG. 3, a recurrence formula as expressed by the reference numeral 15 in FIG. 6A is computed at the time point j=15. FIGS. 4A and 4B show the flow charts of operations of the stack processing section 50 and the recurrence formula computing section 40 when there is an annexed control operator. By conducting this processing for each of j=1, 2, ... $J^n$, g(i, j) is obtained as $G_i(j)$ in the work memory 42. At this moment, the content $G_i(j)$ of the work memory 42 is transferred as $G^n(j)$ to the memory 70.

The above-explained processing for the word n is conducted for all words of n=1, 2 ... N. After the completion of this process, the next feature vector $a_{i+1}$ is inputted and the same process is repeated. When the processing for the final input feature vector $a_I$ is completed the distance $D(A, B^n)$ between the input pattern A and the reference pattern $B^n$ is obtained as $G^n(J^n)$.

When this pattern matching apparatus is applied to a speech recognition system, the distances $D(A, B^n)$ are compared and the name of the word n which minimizes the distance is determined thus accomplishing the recognition processing.

According to the invention, it is thus possible to conduct a DP matching processing in synchronization with the inputting of the input feature vector $a_i$ even when the reference pattern contains control operator which permits branching and/or omission.

As will be understood from the foregoing description, the apparatus of the invention eliminates any necessity for a stack memory having a large capacity, and can complete the processing in synchronism with the inputting of the signal $a_i$ before the completion of the inputting of the pattern A. Consequently, a clockwise DP matching as disclosed in the U.S. patent application Ser. No. 447,829, filed Dec. 8, 1982 wherein the processing of the data available at the time point i is completed at the time point i without waiting for the data input at the next moment (i+1), becomes possible.

Although the principle of the invention has been described on the basis of a specific embodiment, the described embodiment is not exclusive and various changes and modifications may be imparted thereto.

For instance, although in the described embodiment the similarity of $a_i$ and $b_j$ with each other is evaluated in terms of the distance d(i, j), this is not the only possible approach and a concept such as a correlation inverse to the distance may be used as the measure for the evaluation of the similarity. When such a concept is used, the theory of the invention can be applied directly, provided that the operation for selecting the minimum value, conducted in connection with the formula (8) and other formulae, is substituted by an operation for selecting the maximum value. It will also be clear to those skilled in the art that the memories 41 and 42 and the register 51 are not always necessary.

In a modification of the invention, the distance d(i, j) is not calculated directly but a table reference method, similar to SPLIT method as described in PROCEEDINGS ICASSP 83, VOLUME 2 OF 3 VOLUMES, PP. 723 to 766, especially in FIG. 1 on page 723. In such a case, the feature vector $b_j$ does not have the form of vector but is a number which appoints a phoneme-like template effect.

The pattern to be processed is not limited to the speech pattern. For instance, the pattern matching apparatus of the invention can be used for the on-line character recognition in which the direction of lines constituting the character is extracted in the form of a time sequence pattern and the control operators as used in the invention are applied to treat any omission of a part of the line or lines.

Figure 7:
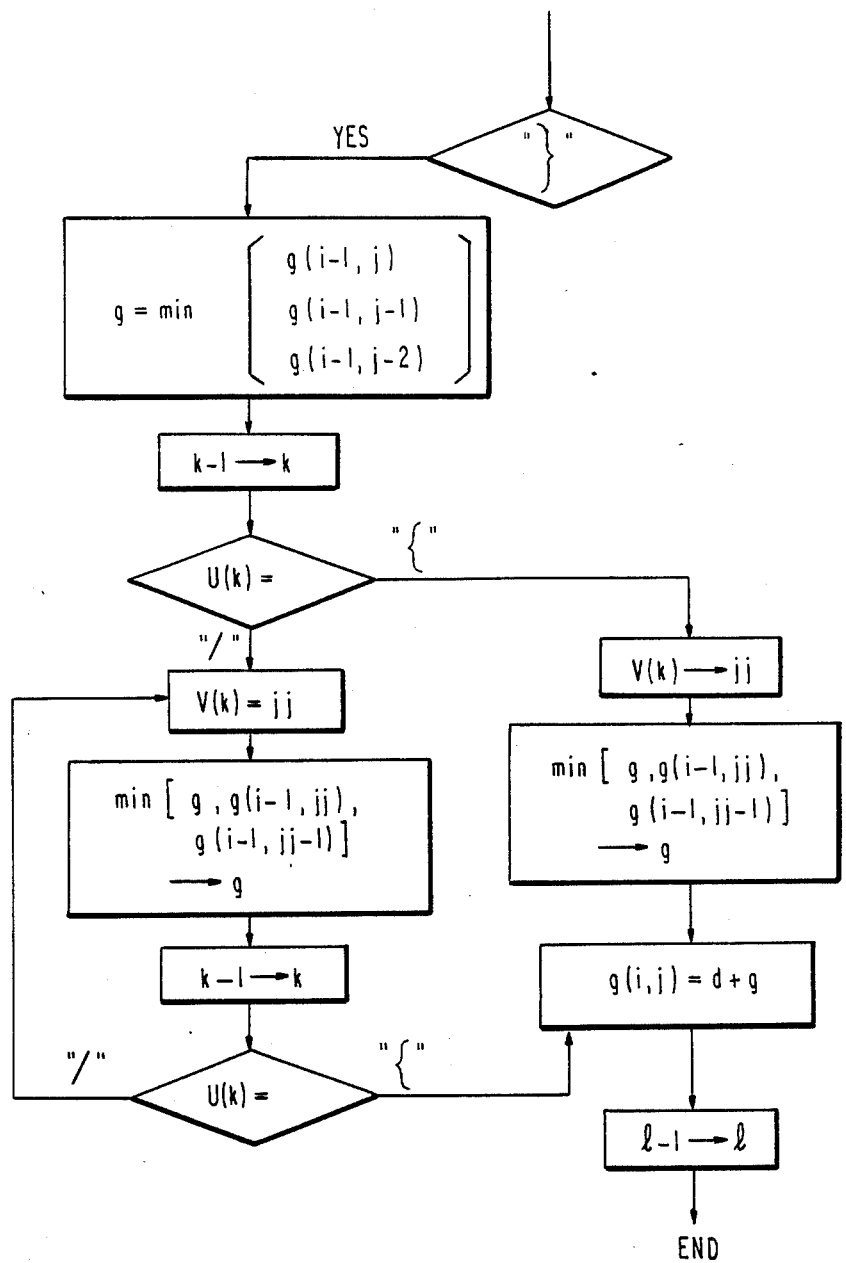
FIG. 7 is a flow chart showing the operation of another embodiment of the invention which can deal with a modification of the control used in the invention.

Various changes and modifications are possible also for the definition and practical way of processing of the control operators. For instance, in a modification, the omission is regarded as being a form of the branching. In this case, the "[" and "]" are not used and, if there is no control operator "/" between the control operators "{" and "}", the segments sandwiched between "{" and "}" is regarded as being segments which can be omitted. In this modification, by conducting processing shown by the flow chart in FIG. 7 when the control operator "}" has appeared, it is possible to conduct the control by means of the stack.

More specifically, when "{" is detected as the process proceeds, the recurrence formula computation is conducted in accordance with the formula (8), and a POP processing is conducted by the control stack as k−1→k. If the read-out control operator U(K) is "{", it is judged that the segments sandwiched beteen "{" and "}" can be omitted, and the address V(k) read out of the control stack is delivered as the signal jj to the recurrence formula computing section 40 in which a computation is executed in accordance with a predetermined formula such as formula (9). Thereafter, a POP processing is made by using l−1 as new value of l (i.e., l−1→l). On the other hand, if the control operator U(K) read out is "/", the address signal V(k) is outputted as jj and a recurrence formula computation is conducted on the basis of the signal jj in accordance with the formula (9), followed by a POP processing in which K−1 is used as the new value of k, thus permitting the discrimination of the control operator read out from the control stack. When the read out control operator U(K) is "{", the execution of the formula (9) is conducted, and the address stack is changed from l−1 to l to effect the POP processing. When the detected control operator U(K) is "/", the signal V(K)=jj is outputted again to return the process for conducting the recurrence formula computation. This operation is repeated until "{" is detected again.

The invention does not always require the closing of the pattern by the control operators "}" or "]". For instance, the pattern may be terminated in an opened state such as . . . { . . . / . . . / . . . . In such a case, the results of the three branches are outputted in parallel form.

The pattern matching apparatus of the invention can be used suitably in realization of a continuous speech recognition system.

It will be also clear to those skilled in the art that various recurrence formulae as shown in IEEE TRANSACTIONS ON ACOUSTICS SPEECH AND SIGNAL PROCESSING, Vol. ASSP-26, No. 1, p. 47 can be used in place of the DP recurrence formula (8) used in the described embodiment.

What is claimed is:

1. A pattern matching apparatus comprising:
   a reference pattern supplying means for supplying a reference feature sequence pattern containing control operators for controlling branching and/or omission;
   an input pattern supplying means for supplying an input pattern of input feature sequence;
   a distance computing section for computing the distance between the feature of said input pattern and said reference feature sequence pattern;
   a work memory having addresses adapted to be selected in accordance with the time point in said reference feature sequence pattern, and adapted to store a cumulative distance of a plurality of said computed distances;
   a recurrence formula computing section for executing a DP matching recurrence formula computation in accordance with a plurality of values read out of said work memory and said cumulative distance;
   a stock for storing the control operator and the position at which said control operator appears; and
   a stack processing section having a stack control section for receiving and detecting control operators from said supplying means and which, when said control operator is detected, operates said stack in a PUSH/POP operation in accordance with the kind of the detected control operator, thereby to control the DP matching recurrence formula computation which is to be conducted in said recurrence formula computing section.

2. A pattern matching apparatus according to claim 1, wherein said stack includes a control stack which stores said detected control operator and the address of the time point of reception for said control operator and adapted to be operated for PUSH/POP operation, and an address stack which stores only said address and which is adapted to be operated for PUSH/POP operation.

3. A pattern matching apparatus according to claim 2, wherein, when said control operator is a first symbol representing the starting of branching, said stack control section writes said first symbol and the address thereof in said control stack at an address k, while writing said address in said address stack at an address l, and effects a PUSH operation for substituting $k+1$ and $l+1$ for k and l, respectively.

4. A pattern matching apparatus according to claim 2, wherein, when said detected control operator is a branch sectioning control operator, said stack control section writes said branch sectioning control operator and the address thereof in said control stack at an address k and effects a PUSH processing for substituting $k+1$ for k, while reading the content of said address stack at an address $l-1$ as a signal j and delivering a signal jj corresponding to said signal j to said recurrence formula computing section.

5. A pattern matching apparatus according to claim 2, wherein, when said detected control operator is a branching ending control operator, said stack control section effects a POP operation for substituting $k-1$ for k while reading, as a signal $C_j$, the control operator and the address thereof stored in said control stack at the address k, and, when the read control operator is a second symbol, said stack control section delivers the address contained by said signal $C_j$ as a signal jj to said recurrence formula computing section, said stack control section repeating this operation until a control operator represented by a first symbol is read from said control stack and, when the operator first symbol is read, conducts a POP operation by substituting $l-1$ for l.

6. A pattern matching apparatus according to claim 2, wherein, when the detected control operator is an omission starting control operator said stack control section writes the omission starting control operator and the address thereof in said control stack at an address k while effecting a PUSH operation by substituting $k+1$ for k, whereas, when said detected control operator is an omission ending control operator, said stack control section effects a POP ope ration of said control stack by substituting $k-1$ for k and reads a signal $C_j$ from the control stack at the address k, and delivers the address V(k) thereof as a signal jj to said recurrence formula computing section.

7. A pattern matching apparatus according to claim 2, wherein, when said detected control operator is a second symbol, said stack control section effects a POP operation of said control stack by substituting $k-1$ for k, and, when the read out control operator is a first symbol, said stack control section judges that the sections sandwiched between said first and second symbols can be omitted to initiate a predetermined recurrence formula computation on the basis of an address signal V(k) from said control stack, followed by a POP operation of said address by substituting $l-1$ for l.

8. A pattern-matching apparatus according to claim 7, wherein when the control operator U(k) read from said control stack is a third symbol, said stack control section picks up the address signal V(k) of this read control operator as a signal jj and conducts a computation for detecting the minimum value on the basis of said signal jj, followed by a POP operation of said control stack by substituting $k-1$ for k, and, when the control operator U(k) read from said control stack is said first symbol, said stack control section operates to effect a predetermined recurrence formula computation and a POP operation of said address stock by substituting $l-1$ for l, whereas, when the read out control operator U(k) is said third symbol, said stack control section operates to return the process to the step for outputting the address signal V(k) as said signal jj and repeats this operation until a first symbol is read from said control. stack.

9. A pattern matching apparatus comprising:
   a reference pattern supplying means for supplying a reference feature sequence pattern containing control operators for controlling branching and/or omission;

an input pattern supplying means for supplying an input pattern of input feature sequence;

a distance computing section for computing a function related to the distance between the feature of said inputs pattern and said reference feature sequence pattern;

a work memory having address adapted to be selected in accordance with the time point in said reference feature sequence pattern, and adapted to store a cumulative function of a plurality of all said computed functions;

a recurrence formula computing section for executing a recurrence formula computation in accordance with a plurality of values read out of said work memory and said cumulative function;

a stack for storing the control operator and the position at which said control operator appears; and a stack processing section having a stack control section for receiving and detecting control operators from said supplying means which, when said control operator is detected, operates said stack in a PUSH/POP operation in accordance with the kind of the detected control operator, thereby to control the recurrence formula computation which is to be conducted in said recurrence formula computing section.

* * * * *

UNITED STATES PATENT AND TRADEMARK OFFICE
CERTIFICATE OF CORRECTION

PATENT NO. : 4,670,850
DATED : June 2, 1987
INVENTOR(S) : Hiroaki Sakoe

It is certified that error appears in the above-identified patent and that said Letters Patent is hereby corrected as shown below:

COLUMN 1, LINE 18  Delete "a" insert --performing--
COLUMN 1, LINE 18  After "at" delete "performing"
COLUMN 4, LINE 18  Delete "$b_1^n$" insert --$b^n_1$--
COLUMN 9, LINE 37  After "a" delete "stock" insert --stack--
COLUMN 10, LINE 18  Delete "operator"
COLUMN 10, LINE 29  Delete "ope ration" insert --operation--
COLUMN 10, LINE 45  After "address" insert --stack--
COLUMN 10, LINE 57  Delete "stock" insert --stack--

Signed and Sealed this

Thirty-first Day of May, 1988

Attest:

DONALD J. QUIGG

*Attesting Officer*   *Commissioner of Patents and Trademarks*